United States Patent
Sawahara et al.

(10) Patent No.: US 12,323,339 B2
(45) Date of Patent: Jun. 3, 2025

(54) DISTRIBUTIVE DEPLOYMENT OF PROCESS AUTOMATION SOFTWARE APPLICATIONS

(71) Applicant: Yokogawa Electric Corporation, Tokyo (JP)

(72) Inventors: Hidenori Sawahara, Spring, TX (US); Ichiro Wake, Tokyo (JP); Patrick Clay, Frisco, TX (US); Vien Nguyen, Frisco, TX (US); David Emerson, Coppell, TX (US); Mark Hammer, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 453 days.

(21) Appl. No.: 17/407,788

(22) Filed: Aug. 20, 2021

(65) Prior Publication Data
US 2023/0053594 A1    Feb. 23, 2023

(51) Int. Cl.
*H04L 47/78* (2022.01)
*H04L 47/70* (2022.01)
*H04L 47/724* (2022.01)

(52) U.S. Cl.
CPC .......... *H04L 47/788* (2013.01); *H04L 47/724* (2013.01); *H04L 47/821* (2013.01)

(58) Field of Classification Search
CPC ...... G05B 19/4185; G05B 2219/32406; G05B 19/418; G05B 19/4188; G05B 2219/31343; H04L 41/0886; H04L 41/12; H04L 47/788; H04L 41/0806; G06F 30/27
See application file for complete search history.

(56) References Cited

U.S. PATENT DOCUMENTS

| | | | |
|---|---|---|---|
| 8,914,783 B2 | 12/2014 | Van Camp | |
| 9,722,617 B2 | 9/2017 | Kreft et al. | |
| 9,800,465 B2* | 10/2017 | Steinder | H04L 41/0813 |
| 9,912,737 B2 | 3/2018 | Patin et al. | |

(Continued)

FOREIGN PATENT DOCUMENTS

| | | |
|---|---|---|
| JP | 2003124937 | 4/2003 |
| WO | 2020251850 | 12/2020 |

OTHER PUBLICATIONS

"PlantPAx Distributed Control System Configuration and Implementation" System Release 5.0. Rockwell Automation Publication PROCES-UM100B-EN-P. May 2021.

(Continued)

*Primary Examiner* — Jay L Vogel
(74) *Attorney, Agent, or Firm* — Gray Ice Higdon (57) ABSTRACT

Implementations are described herein for automatic deployment of function block application programs (FBAPs) across process automation nodes of a process automation system. In various implementations, one or more constraints associated with execution of a FBAP may be identified. Based on the one or more constraints, a process automation system that includes a plurality of process automation nodes may be analyzed. Based on the analysis, a subset of two or more process automation nodes on which to distributively deploy the FBAP may be selected from the plurality of processing node. In response to selecting the subset, the FBAP may be distributively deployed across the two or more process automation nodes of the subset.

16 Claims, 7 Drawing Sheets

(56) References Cited

U.S. PATENT DOCUMENTS

| | | | |
|---|---|---|---|
| 10,268,185 B2 | 4/2019 | Bliss et al. | |
| 10,693,813 B1* | 6/2020 | Jacob Da Silva | H04L 12/4641 |
| 2014/0164452 A1* | 6/2014 | Ying | G06F 16/182 |
| | | | 707/827 |
| 2016/0034529 A1* | 2/2016 | Nguyen | G06F 16/3325 |
| | | | 707/713 |
| 2016/0065656 A1* | 3/2016 | Patin | H04L 67/10 |
| | | | 709/201 |
| 2017/0078409 A1* | 3/2017 | Yazir | H04L 67/51 |
| 2018/0024537 A1 | 1/2018 | Chauvet et al. | |
| 2019/0317812 A1* | 10/2019 | Gebara | G06Q 40/04 |
| 2021/0029040 A1* | 1/2021 | Masurekar | H04L 41/0894 |
| 2022/0116452 A1* | 4/2022 | Rafey | G06F 18/24137 |

OTHER PUBLICATIONS

International Search Report and Written Opinion issued for Application No. PCT/IB2022/057777, 8 pages, dated Nov. 22, 2022.
Japanese Patent Office: Notice of Refusal issued for Application No. 2024-510384, 10 pages, dated Jan. 21, 2025.

* cited by examiner

DISTRIBUTIVE DEPLOYMENT OF PROCESS AUTOMATION SOFTWARE APPLICATIONS

BACKGROUND

Process automation systems are typically implemented as distributed computing environments, e.g., with large numbers of process automation hardware such as distributed control nodes (DCNs) connected to a process automation network. Function block application programs (FBAPs) control of various aspects of a process automation workflow and are deployed on execution control engines (or simply "execution engines") on these numerous nodes, some near the "edge" of the process automation network. In some cases, these execution control engines may be implemented as or within virtual machines or other similar containers, e.g., on DCNs.

SUMMARY

Execution engines—which increasingly are required to communicate with each other pursuant to open process automation standards—provide execution environments for function blocks and obscure underlying details about individual process automation nodes (e.g., hardware architecture, operating system). This ostensibly frees administrators and designers from these underlying details when designing or maintaining a process automation system. Nonetheless, these underlying details may still be relevant for designing an optimal process automation system.

Implementations are described herein for automatic and distributive deployment of function block application programs (FBAPs) across process automation nodes of a process automation system. More particularly, but not exclusively, techniques described herein facilitate distributive deployment of FBAPs across multiple execution engines while accounting for underlying details about the process automation nodes, relationships between the process automation nodes, and constraints associated with the FBAPs.

In various implementations, various types of constraints associated with one or more FBAPs may be identified by analyzing the FBAPs (e.g., such as by assessing underlying source code), documents describing the one or more FBAPs and/or their desired or required behaviors, runtime tests of the FBAPs, manual entry, etc. As used herein, "source code" refers to instructions for a computer, written in a general programming language such as C, C++, Java, Python, etc., or in a lower level language such as assembly code—that is capable of being compiled into and/or interpreted as an executable computer program.

Based on these constraints, a process automation system that includes a plurality of process automation nodes (executing a plurality of execution engines) may be analyzed, e.g., to determine operational parameters and/or performance capabilities of the process automation nodes (e.g., DCN system management information and capabilities), functional, spatial, high availability requirements, and/or network relationships between the process automation nodes, and/or other relevant environmental information (e.g., temperature, humidity, particulate levels, etc.). Based on the analysis of the process automation system, subsets of two or more process automation nodes that provide execution engines may be selected for deployment of a FBAP. Various types of process automation nodes may operate execution engines in which part of a FBAP can be executed, such as a distributed control node (DCN), an input/output node with processing capabilities, a container or virtual machine, to name a few.

In some implementations, a method may be implemented using one or more processors and may include: identifying one or more constraints associated with execution of a function block application process (FBAP); analyzing, based on the one or more constraints, a process automation system that includes a plurality of process automation nodes; based on the analyzing, selecting a subset of two or more process automation nodes, from the plurality of processing nodes, on which to distributively deploy the FBAP; and in response to selecting the subset: distributively deploying the FBAP across the two or more process automation nodes of the subset.

In various implementations, the method may include assembling the FBAP into a plurality of function blocks, wherein the distributively deploying includes installing a respective one of the plurality of function blocks on an execution engine of a respective one of the two or more process automation nodes of the subset. In various implementations, the assembling may include generating one or more communication modules for each of the plurality of respective function blocks, the one or more communication modules facilitating publishing or subscribing of data between the plurality of function blocks.

In various implementations, the one or more constraints associated with execution of the FBAP may include a limit on a number of process automation nodes on which the FBAP can be distributively deployed. In various implementations, the limit on the number of process automation nodes may be determined based on available computing resources of the plurality of process automation nodes.

In various implementations, the one or more constraints associated with execution of the FBAP include a time limit for execution of a control loop that includes or is implemented by the FBAP. In various implementations, the one or more constraints associated with execution of the FBAP include one or more location constraints. In various implementations, one or more of the location constraints are imposed between two or more function blocks of the FBAP. In various implementations, one of the location constraints include a maximum physical distance between a first process automation node of the subset and another process automation node. In various implementations, the method further include determining the maximum physical distance based on a communication protocol used between the first process automation node of the subset and the another process automation node. In various implementations, the another process automation node may include a sensor that generates sensor data that is processed by the FBAP.

In various implementations, one of the location constraints include a maximum number of network hops between a first process automation node of the subset and another process automation node. In various implementations, one of the location constraints include a maximum number of network hops between a first process automation node of the subset and a sensor that generates sensor data that is processed by the FBAP. In various implementations, one of the location constraints include a maximum number of smart junction boxes between a first process automation node of the subset and another process automation node. In various implementations, one of the location constraints may include a requirement that a first process automation node of the subset and another process automation node be co-located in a room of a process automation facility in which at least part of the process automation system is implemented.

In various implementations, the analyzing includes: identifying a first candidate process automation node of the plurality of process automation nodes that satisfies one or more of the constraints associated with execution of the FBAP; evaluating actual or potential exhaustion of computing resources of the first candidate process automation node; based on the evaluating, selecting, as at least one of the subset of two or more process automation nodes, another process automation node having the closest spatial or network relationship to the first candidate process automation node.

In various implementations, the FBAP may be a first FBAP of a plurality of FBAPs to be deployed among the plurality of process automation nodes, and the method may further include: ranking the plurality of FBAPs based on respective priorities of the plurality of FBAPs; and selecting, for each of the plurality of FBAPs in an order determined based on the ranking, a respective subset of the plurality of process automation nodes on which to distributively deploy the FBAP.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for automatic and distributive deployment of function block application programs (FBAPs) across process automation nodes of a process automation system. In various implementations, various types of constraints associated with one or more FBAPs may be identified by analyzing source code underlying the one or more FBAPs, documents describing the one or more FBAPs and/or their desired or required behaviors, runtime tests of the FBAPs, manual entry, etc. Based on these constraints, a process automation system that includes a plurality of process automation nodes may be analyzed, e.g., to determine operational parameters and/or performance capabilities of the process automation nodes, as well as functional, spatial, and/or network relationships between the process automation nodes. Based on the analysis of the process automation system, subsets of two or more process automation nodes that provide suitable execution engines may be selected for deployment of a FBAP. Various types of process automation nodes may provide execution engines in which part of a FBAP can be executed, such as a distributed control node (DCN), an input/output node with processing capabilities, or a virtual machine, to name a few.

A process automation system may be analyzed in various ways. In some implementations, documents such as a input/output (I/O) summary or list, a process flow diagram (PFD), a piping and instrumentation diagram (P&ID), etc., may be analyzed, e.g., using techniques such as natural language processing, markup language processing, optical character recognition (OCR), object recognition, graph analysis, etc., to identify the aforementioned operational parameters and/or or performance capabilities of the process automation nodes, and/or the various types of relationships therebetween. In other implementations, information about the process automation system may be stored in one or more databases, e.g., when the process automation system is built, and these data may be leveraged for analysis of the process automation system.

Network relationships between process automation nodes may be identified in some implementations using a network crawler that systematically browses, maps, and/or indexes the various process automation nodes of a process automation system. Additionally or alternatively, network resources such as domain name server (DNS) routing tables and other networking components (e.g., routers, switches) may be queried for network relationship data.

Spatial relationships between process automation nodes may be determined, for instance, from data contained in blueprints, P&ID documents, maps of process automation facilities, or by determining position coordinates of physical process automation nodes such as DCNs. Position coordinates of physical process automation nodes may be determined in various ways, such as by using wireless triangulation, global positioning system (GPS) coordinates, or via localization performed by humans or robots. Maps of process automation facilities may be used to determine (or at least estimate) spatial relationships between process automation nodes by identifying defined areas such as field equipment rooms (FERs) or central control rooms (CCRs) in which process automation nodes are physically hosted. Physical distances between those rooms (e.g., between their centers or between ingress/egress points) may be used as proxy distances between process automation nodes housed within.

Constraints on execution of FBAPs may be selected and/or designed to ensure that mission-critical processes are performed in a timely, predictable, and/or consistent manner. FBAPs may be subject to various types of constraints. Performance constraints may include, for instance, a limit on a number of process automation nodes on which a FBAP can be implemented in a distributed manner. It may be deemed too risky to implement a particularly critical FBAP on multiple devices, especially if some of those devices do not meet some criteria of reliability or availability. More generally, in some implementations, FBAPs may be assigned minimum reliability thresholds, and only process automation nodes that also meet those thresholds (individually or collectively) may be selected for deployment.

Additionally or alternatively, performance constraints may include time limits for execution of tasks such as operating a portion of a control loop or raising an alarm based on sensor signal(s). For example, a particular control loop may rely on a sensor signal being processed at a particular frequency or within a particular time interval. If that frequency or time interval is not met, adverse consequences (e.g., unintended chemical reactions, improper treatments, safety hazards, part failures) may occur. A time limit for execution of a FBAP may be set manually or may be determined automatically, e.g., based on time limit(s) contained in underlying source code.

Location constraints of FBAPs may include, for instance, a maximum physical distance between process automation nodes implementing all or part of a FBAP, and/or between process automation nodes that implement all or part of a FBAP and other process automation nodes, such as sensors that generate sensor data processed by the FBAP. In some implementations, location constraints may include maximum number of network hops and/or smart junction boxes (SJBs) between process automation nodes that implemented or that interact with a FBAP.

In some implementations, maximum distance, maximum network hops, maximum number of nodes on which the FBAP can be deployed, and/or maximum SJBs constraints may be selected dynamically based on each other and/or based on other factors, such as a time limit constraint imposed on a FBAP. For example, a maximum physical distance constraint may be determined based at least in part on a communication protocol used between process automation nodes involved with implementation of a FBAP. Data may travel more quickly and/or at a greater data rate over Ethernet than, for instance, Wi-Fi, ZigBee, or Z-Wave. Accordingly, the maximum physical distance permitted may be greater when the nodes in question are connected by a series of Ethernet connections than when one or more hops between the nodes is implemented using Wi-Fi (which may present a bottleneck). In some cases, the maximum distance and/or network hops allowed between aspects of a FBAP may be further calculated based on a time limit imposed on the FBAP.

Environmental data may also be taken into account when evaluating process automation systems. For example, a process automation node may have limited temperature tolerances (cold or hot). Various factors can contribute to the process automation node reaching, and even exceeding, these temperature tolerances. For example, the process automation node may be overburdened with computational tasks, which increases its temperature from within. Additionally or alternatively, source(s) of heat in the node's environment, such as equipment, chemicals, heat sources, and so forth, may increase the node's temperature. Likewise, some chemicals and/or processes (e.g., those requiring application of liquid nitrogen) may lower an ambient temperature below tolerances of a process automation node. Accordingly, in various implementations, temperatures measured by temperature sensors (e.g., inside of process automation nodes, at or within junction boxes, in FERs, etc.) may be accounted for when evaluating process automation nodes for potential deployment of function blocks. Other tolerances of process automation nodes, such as tolerances for particulates, air acidity, humidity, etc., may be accounted for in a similar fashion.

In many instances, FBAPs to be implemented in a process automation system may number in the multiple thousands. Similarly, there may be hundreds or thousands of process automation nodes that potentially could be used to implement all or parts of individual FBAPs, such as function blocks. To reduce the time and/or computational resources that might otherwise be required to perform brute force analysis of all the potential permutations of FBAP assignments across process automation nodes, in some implementations, FBAPs may be assigned priorities, e.g., manually and/or automatically. These priorities may be used to rank the FBAPs, so that process automation nodes can be selected and used for deployment of the higher-priority FBAPs first. As higher-ranked FBAPs are distributively deployed across process automation nodes, the computational resources of the process automation system may be reevaluated, e.g., based on constraints associated with execution of the remaining unassigned FBAPs, as well as other factors that result from previously deployments, such as increased temperatures of nodes and/or their environments. Lower-ranked FBAPs may then be deployed based on the reevaluation.

As used herein, a "FBAP" includes any process cooperatively implemented within a process automation system by one or more process automation nodes, often with little or no human intervention. In some cases, the degree to which a FBAP is automated may exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, etc.

One common example of a FBAP is a process loop in which one or more actuators are operated automatically (without human intervention) based on output of one or more sensors. In many cases, FBAPs may be logically divided into distinct logical modules or builds that will be referred to herein as "function blocks." Each function block may perform one or more sub-aspects of the FBAP as a whole. In various implementations, multiple function blocks forming a FBAP may be distributively deployed across multiple process automation nodes that are selected using techniques described herein. As used herein, a "process automation node" may refer to a DCN, other types of controllers, input/output nodes, virtual machines, and any other computing component capable of operating an execution engine on which function block(s) can be deployed.

Figure 1:
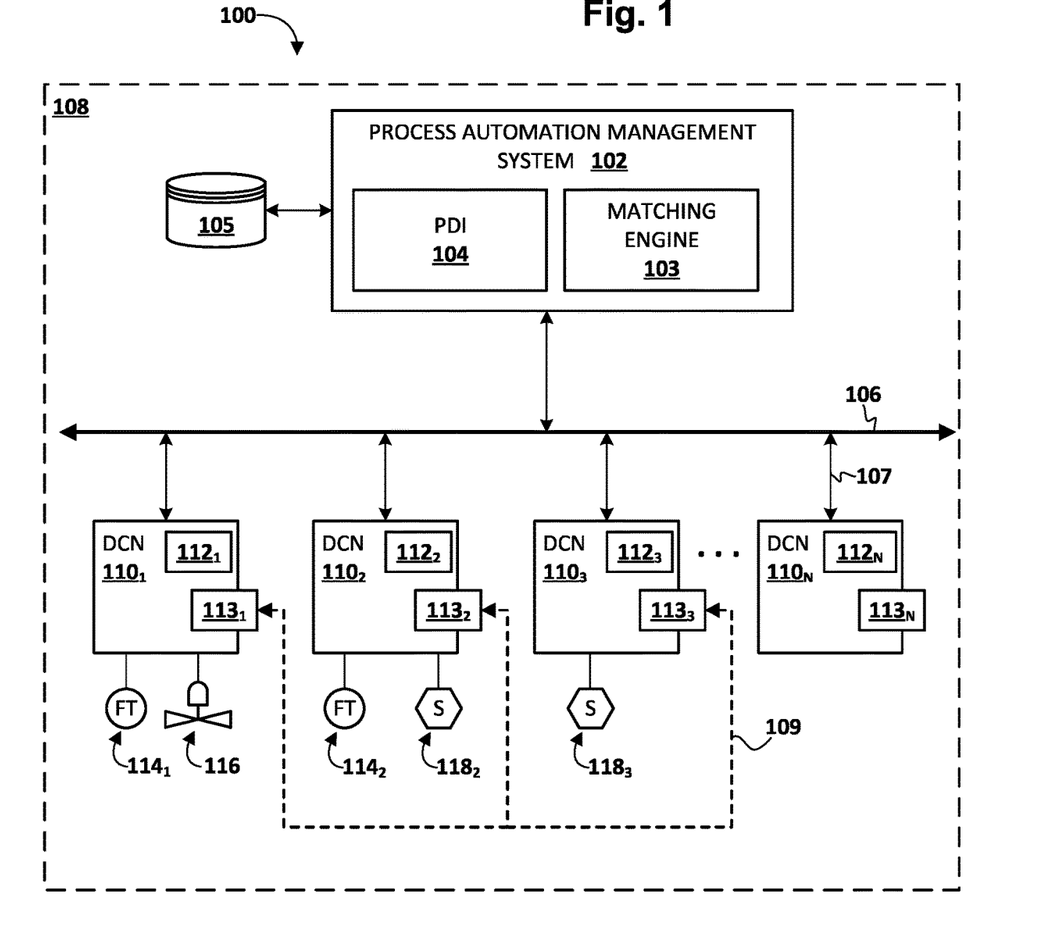
FIG. 1 schematically depicts an example process automation environment in which selected aspects of the present disclosure may be implemented, in accordance with various implementations.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 (alternatively referred to herein as "process automation system 108") may take numerous forms and may be designed to implement any number of at least partially automated processes. For example, process automation facility 108 may form all or part of a chemical processing plant, an oil or natural gas refinery, a catalyst factory, a manufacturing facility, etc.

Process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, mesh networks, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QoS). Additionally, nodes that exchange data over process automation network 106 may implement time-sensitive networking (TSN) to facilitate time synchronization and/or real-time control streams.

Process automation management system 102 may include a matching engine 103, a plant data intake (PDI) 104, and a database 105 that stores information used by PDI 104 and matching engine 103 to practice selected aspects of the present disclosure. Various aspects of process automation management system 102, such as matching engine 103 and/or PDI 104, may be combined and may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes/devices are operably coupled with process automation network 106. In FIG. 1, for instance, N (positive integer) DCNs $110_{1-N}$ are operably coupled with process automation network 106. Each DCN may include circuitry or logic 112 that may take various forms, such as processor(s) that execute instructions in memory, a field-programmable gate array (FPGA), an application-specific integrated circuit (ASIC), and so forth. DCNs 110 may range in hardware capabilities from a small, single-board computer (with or without I/O) to a high-availability rack-mounted server.

Figure 2:
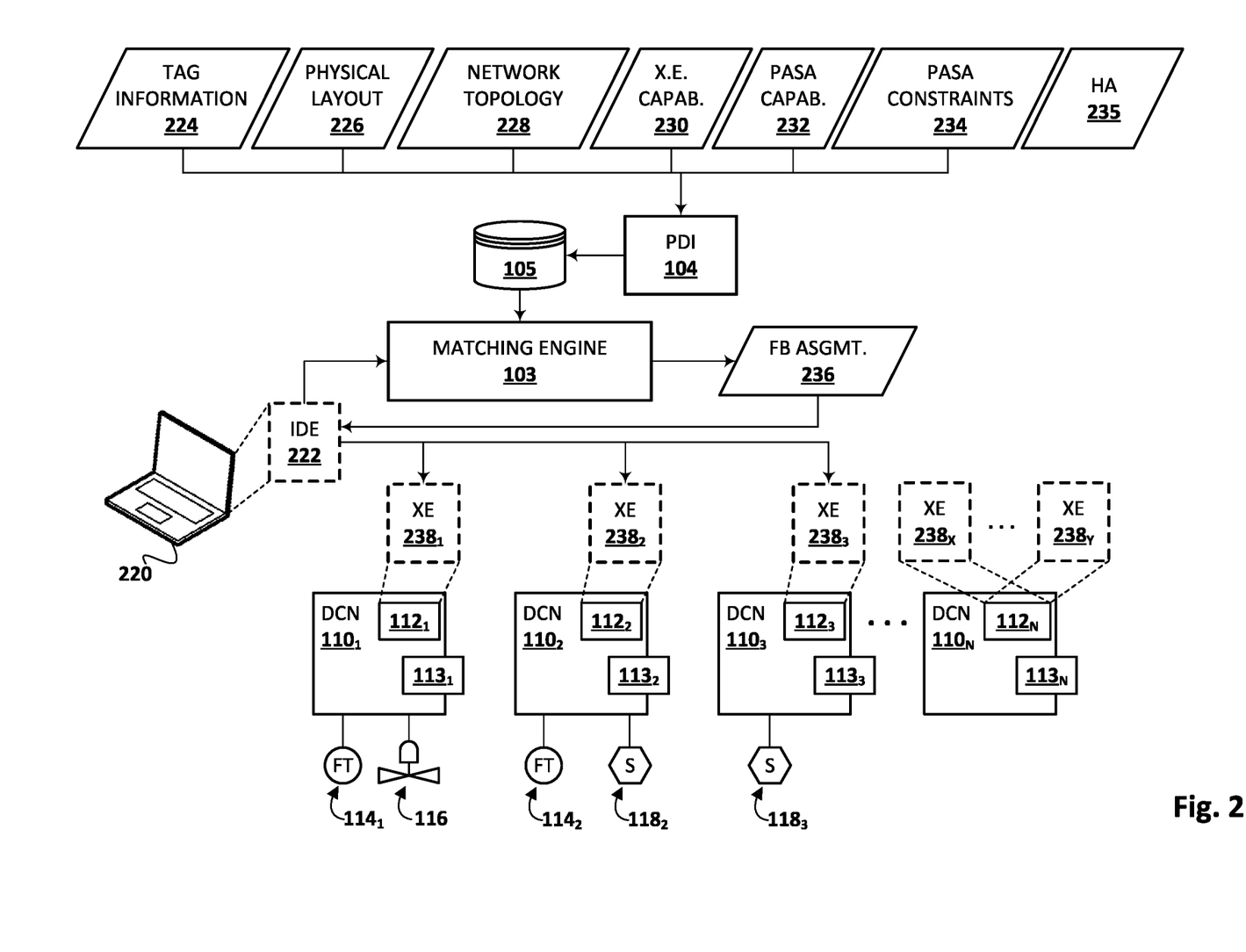
FIG. 2 schematically depicts an example of how various components configured with selected aspects of the present disclosure may cooperate to facilitate distributive deployment of FBAPs, in accordance with various implementations.

Each DCN 110 may have one or more roles to play in process automation facility 108. "Compute" DCNs, for instance, may control a process loop (e.g., a chemical process loop) in which various "field" devices (e.g., devices having sensors and/or actuators) interface with each other to perform some number of function control blocks (FBs). While not depicted in FIG. 1, in various implementations, each logic 112 may operate one or more execution engines to which function block(s) of FBAPs can be deployed. Example execution engines are depicted in FIG. 2.

Each DCN 110 may have various input/output (I/O) and other hardware components that dictate at least some of its operational technology (OT) capabilities and, more generally, its role at process automation facility 108. OT capabilities may vary widely among industries. In some cases, OT capabilities may include, but are not limited to, a count of I/O channels; type(s) of I/O channel(s) available; a nominal range limit; nominal unit(s) of measurement; a nominal update frequency; one or more analog-to-digital conversion parameters; one or more signal conditioning parameters; supported open standard protocols such as the Open Platform Communications (OPC) Unified Architecture (OPC UA) and/or Modbus; or any combination thereof.

In FIG. 1, first DCN $110_1$ is operably coupled with a flow transmitter (FT) component $114_1$ and an actuator (e.g., a valve) 116. Second DCN $110_2$ is operably coupled with a FT component $114_2$ and a sensor $118_2$, but no actuator. Third DCN $110_3$ is operable coupled with a sensor $118_3$ but no actuator. Actuators 116 may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc. A sensor 118 may take various forms, including but not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth.

Unlike DCNs $110_{1-3}$, $DCN_N$ does not include any input/output (actuators or sensors). Instead, $DCN_N$ may be a "compute only" DCN whose role is to facilitate cooperation between itself and one or more other DCNs 110 on process automation network 106 to implement an at least partially automated process. For example, DCN $110_N$ may control a single process loop (e.g., a chemical process control loop) that involves one or more other DCNs 110. In some cases, such a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 and/or FT components 114 to ascertain data about chemical levels, flow rates (e.g., across valves), tank temperatures, control rates, etc., and may control one or more actuators 116 based on these data and/or comparisons of these data to various criteria and/or thresholds. For instance, compute DCN $110_N$ can control actuator 116 by transmitting, to first DCN $110_1$, corresponding command(s) that can optionally conform to a protocol that is specific to and/or implemented by first DCN $110_1$.

In various implementations, one or more out-of-band communication channels 109 may be established between compatible wired or wireless communication interfaces 113 of two or more DCNs, such as between DCNs $110_{1-3}$ in FIG. 1. Out-of-band communication channel 109 may be outside of (e.g., separate from, implemented using a different communication technology, etc.) from process automation network 106 of process automation system 108. While a single out-of-band communication channel 109 is depicted in the Figures, this is not meant to be limiting. Any number of out-of-band communication channels may be established between any number of process automation nodes.

In scenarios in which process automation network 106 is implemented using Ethernet, a connection 107 between a DCN 110 and process automation network 106 may be a registered jack (RJ) 45 connection in some implementations. In many such cases, out-of-band communication channel 109 may be implemented using different communication technologies such as USB, NFC, Bluetooth, etc. However, in other implementations, out-of-band communication channel 109 may be implemented using the same type of communication technology (e.g., Ethernet) as process automation network 106, albeit as a separate network/subnet that is sandboxed from process automation network 106. In various implementations, out-of-band communication channel 109 may communicatively couple communication interfaces 113 of more than two process automation nodes, as is the case in FIG. 1, and therefore may alternatively be referred to as an "out-of-band network."

Administering process automation system 108 may present a variety of technical challenges. There may be hundreds or even thousands of FBAPs that need to be implemented across similarly-large numbers of process automation nodes. Each FBAP may be subject to various constraints relating to, for instance, performance, location, latency, etc. For example, some FBAPs or aspects thereof (e.g., function blocks) may need to execute fully within some time limit. If function blocks are distributed among process automation nodes connected by a high-latency network connection, there is a risk this time limit will be violated, which can lead to myriad negative outcomes, such as corrupted or failed chemical processes.

Additionally, each process automation node may have different information technology (IT) and/or OT capabilities. Once FBAPs are at least partially distributively deployed, those IT and/or OT capabilities may change. For example, computational resources (e.g., memory, processor cycles) of a DCN may become exhausted, an internal temperature of the DCN may approach its temperature threshold, and/or input/output elements of a node may be no longer available. In sum, allocating large numbers of FBAPs among large numbers of process automation nodes tends to be highly labor intensive, tends to require significant expertise and/or experience, and is prone to human error.

Accordingly, implementations are described herein for automatic deployment of FBAPs across process automation nodes of a process automation system. In various implementations, PDI 104 may analyze process automation system 108, e.g., by processing (e.g., parsing, performing OCR, NLP, etc.) various schematics, source code, specifications, I/O summaries/lists, control narratives, P&ID documents, etc., to process (e.g., organize into data structures, de-duplicate, normalize, etc.) the data contained within. These data about process automation system 108 may be stored, for instance, in a database 105. Once processed and stored in database 105, these data may then be used by various components described herein to distributively deploy FBAPs across multiple process automation nodes.

Based on the analysis performed by PDI 104, matching engine 103 may be configured to match FBAPs and/or aspects thereof (e.g., function blocks) with suitable execution engines. For example, matching engine 103 may be configured to select a subset of two or more process automation nodes, from a plurality of processing nodes $110_{1-N}$ forming process automation system, on which to distributively deploy a FBAP. This selection may be based on constraints associated with execution of the FBAP, as well as any number of aspects of process automation system 108 as a whole, individual process automation nodes (e.g., $110_{1-N}$), a physical and/or virtual network topology of process automation network 106 or portions thereof, out-of-band communication channel(s) 109, a physical layout of process automation facility 108, measured environmental parameters such as temperature, humidity, particulates, air acidity, etc.

FIG. 2 schematically depicts an example of how various components configured with selected aspects of the present disclosure may cooperate to facilitate distributive deployment of FBAPs, in accordance with various implementations. In FIG. 2, a computing device 220 (depicted as a laptop but this is not meant to be limiting) executes an integrated development environment (IDE) 222 that is operable by a user (not depicted) to distributively deploy FBAPs among a plurality of process automation nodes $110_{1-N}$. More particularly, IDE 222 may be operable by a user to distributively deploy (e.g., compile and install) FBAPs among a plurality of execution engines $238_{1-X}$ provided by the plurality of process automation nodes $110_{1-N}$. As noted above, performing this distributive deployment manually may be labor intensive, cumbersome, and/or prone to lead to errors.

Plurality of execution engines $238_{1-X}$ may take various forms. In some implementations, an execution engine 238 may be a computing environment that is facilitated via computing resources (e.g., memory, processor(s)) of a DCN 110, and that obscures underlying hardware and/or operating system details of DCN 110. As one example, an execution engine 238 may take the form of a virtual machine, such as a Java Virtual Machine (JVM), that is configured to execute, interpret, or otherwise implement function blocks. To this end, function blocks may take various forms, such as fully-compiled binaries, executable bytecode, and so forth. Some process automation nodes, such as DCN $110_N$ may provide multiple execution engines $238_{X-Y}$.

PDI 104 may be configured obtain, retrieve, capture, receive, or otherwise process a variety of different types of data about process automation system 108 from a variety of different sources. These data may include, for instance, tag information 224, physical layout information 226, network topology information 228, execution engine ("X.E." in FIG. 2) capabilities 230, FBAP capabilities 232, FBAP constraints 234, and high availability (HA) constraints 235. PDI 104 may analyze these data 224-235 using various techniques, such as NLP, OCR, etc., and store various aspects and/or extracted features in database 105.

Tag information 224 may include "tags" that are assigned to, for instance, FBAPs, individual process nodes, etc. Tags may be alphanumeric strings or other indicia that provide indications of, for instance, what roles these elements are supposed to play in a process automation system, and/or a category of tasks that the elements are supposed to perform. A tag may be assigned to, for instance, a process control loop. Any FBAPs or process automation nodes (e.g., DCNs, sensors, etc.) that are also supposed to be associated with execution of that process control loop may be assigned the same tag. In some implementations, tags may be highly influential, even dispositive, as to which execution engines 238 of which process automation node(s) a FBAP is distributively deployed. In this way, tags assigned to FBAPs may be used to determine one or more FBAP constraints 234. For example, two FBAPs assigned the same tag may be constrained to being deployed on execution engines 238 of process automation nodes that are within some maximum number of network hops from each other, or co-located within the same room (e.g., a FER or CCR).

Physical layout information 226 may include architectural drawings, maps, schematics, P&IDs, process flow diagrams, information gathered while robots perform SLAM (simultaneous localization and mapping), etc., that set forth a physical layout of components and/or rooms/areas of a process automation system. PDI 104 may extract various types of features and/or other information from such data, include but not limited to spatial relationships between process automation nodes, rooms (e.g., FERs, CCRs) in which process automation nodes are housed, and so forth.

Network topology information 228 may include information about one or more physical and/or virtual network topologies of one or more portions of process automation network 106. This data may include, for instance, locations and/or arrangements of subnets, local area networks, wireless networks (including their effective ranges), bandwidths of networks, location and/or bandwidth of out-of-band channel(s) 109, etc. In some implementations, this network topology information may be input manually, e.g., by IT personnel. Additionally or alternatively, in some implementations, network topology information 228 may be ascertained automatically, e.g., by one or more software processes (sometimes referred to as "bots" or "crawlers") that automatically map out computer networks. PDI 104 may represent and/or store this network topology information 228 in database 105 in various forms, e.g., as routing tables, tables of network nodes, graphs in which nodes represent constituent elements of process automation system 108 and edges represent portions of process automation network 106 that connect those constituent elements, etc.

Execution engine (X.E.) capability information 230 may include computational resources such as memory, processing cycles, OT capabilities, availability of out-of-band channel(s) (e.g., 109) to other nodes, processing speed, processor specification(s), network bandwidth, etc., associated with process automation nodes 110 that implement individual execution engines 238. Processor specifications may include, but are not limited to, a processor type, clock speed, bus speeds, registers, type of arithmetic logic unit (ALU), etc. Process automation nodes such as DCNs $110_{1-N}$ may include various types of processors, such as a generic central processing unit (CPU), a graphical processing unit (GPU), a tensor processing unit (TPU), etc. Where a process automation node such as a DCN 110 provides one execution engine 238, these execution engine capabilities may simply correspond to the hardware of the node itself, such as available memory, processing cycles or speed, network bandwidth, etc. Where a process automation node such as DCN $110_N$ provides multiple execution engines $238_{X-Y}$, the execution capabilities of DCN $110_N$ as a whole may be allocated among the multiple execution engines.

FBAP capabilities 232 may include, for instance, one or more tasks that are executed by a FBAP, one or more roles played by a FBAP in process automation system 108, capabilities and/or roles of constituent FBAP components (e.g., function blocks), etc. FBAP constraints 234 associated with execution of FBAPs or constituent components thereof may include, for instance, time limits, location constraints (e.g., maximum distances between FBAPs or components of FBAPs, room-based constraints), security constraints, maximum number of nodes across which the FBAP can be distributively deployed, network constraints (e.g., time-sensitive network or "TSN", maximum network hops permitted between elements, etc.), reliability constraints (e.g., permissible downtime), and so forth. High availability constraints 235 may include rules, policies, or other heuristics that govern aspects of process automation such as permissible downtime or required uptime, quality of service, etc.

Matching engine 103 may be configured to analyze the various extracted data (e.g., 224-235) that is stored in database in order to automatically match FBAPs to suitable process automation nodes for deployment. In FIG. 2, for instance, matching engine 103 may generate function block assignments 236 that indicate to which of execution engines $238_{1-Y}$, and hence, to which of process automation nodes $110_{1-N}$, FBAPs should be distributively deployed.

In some implementations, user-selected or defined FBAP components (e.g., function blocks) manually entered at IDE 222 may be exported to matching engine 103 as depicted by the arrow, alone or in combination with user-selected assignments of those FBAP components to process automation nodes. In this way, the deployment of potentially large numbers of FBAPs between large numbers of candidate process automation nodes may be bootstrapped or otherwise guided at least in part by a user. The operations performed by matching engine 103 may augment, alter, replace, etc., these user-selected FBAP deployments based on the various data 224-235 processed by PDI 104 and stored in database 105. For example, techniques described herein may be used to generate recommendations, alarms, or other helpful feedback that is presented to the user at IDE 222 as the user designs a process automation system.

In other implementations, matching engine 103 start from scratch and may make all decisions regarding deployment of FBAPs. In some such implementations, matching engine 103, PDI 104, or another component may identify and/or define (e.g., carve out) FBAP components such as function blocks. Additionally or alternatively, a user operating IDE 222 may identify and/or define these function blocks manually. In any case, the results of the distributive deployment may be presented to a user at IDE 222. The user of IDE 222 may have various opportunities to view, and alter if desired, assigned deployments of FBAPs among execution engines $238_{1-Y}$ of DCNs $110_{1-N}$.

Figure 3:
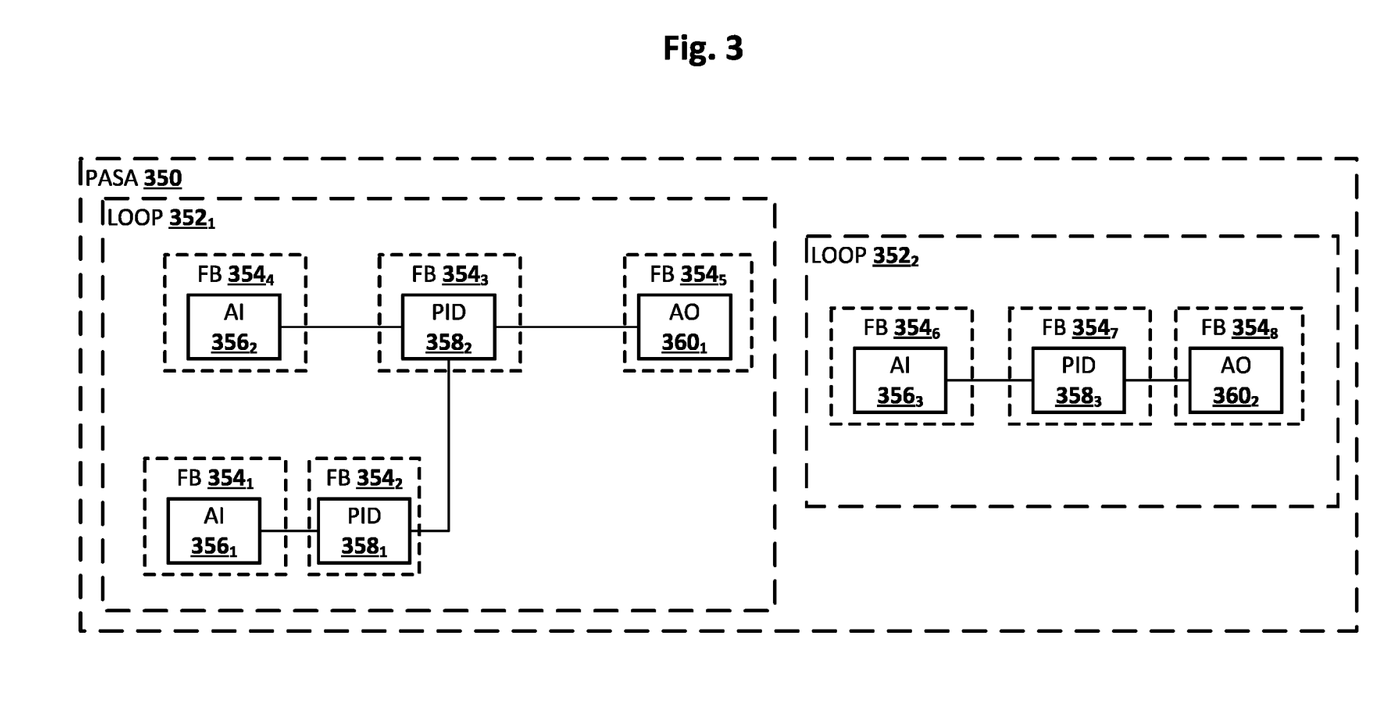
FIG. 3 and FIG. 4 schematically depict an example of how function blocks may be distributively deployed among multiple execution engines of multiple DCNs, in accordance with various implementations.
Figure 4:
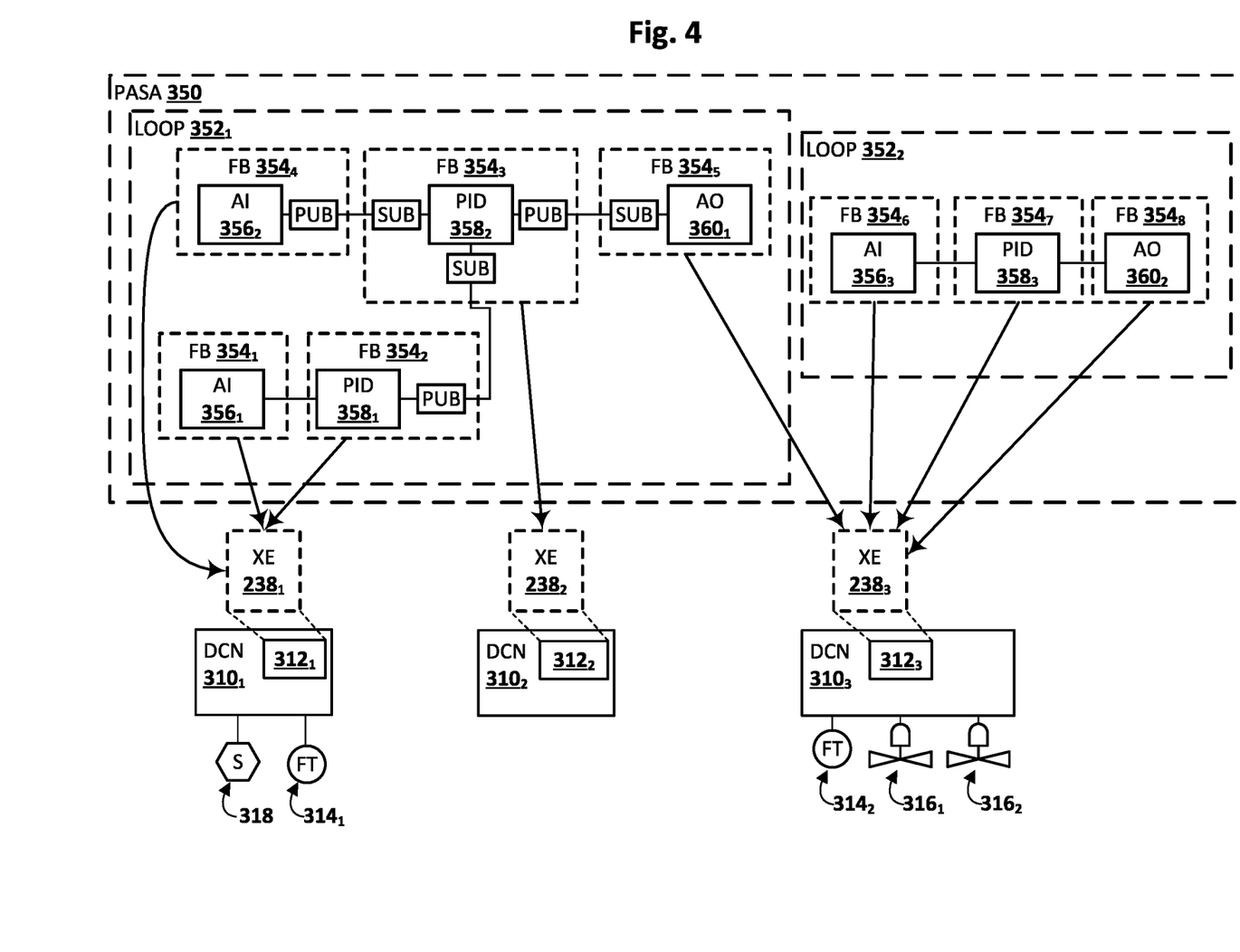

FIGS. 3 and 4 schematically depict an example of how function blocks may be distributively deployed among multiple FBAPs, in accordance with various implementations. In FIG. 3, a FBAP 350 includes two loops $352_1$ and $352_2$. First loop $352_1$ includes five function blocks $354_{1-5}$. First function block $354_1$ includes a first analog input (AI) process $356_1$ that may obtain analog input from, for instance, a sensor. Output of first AI process $356_1$ is provided to, for instance, a first proportional-integral-derivative (PID) controller $358_1$, which may perform various operations based on the analog input provided by first AI process $356_1$. In FIG. 3, first PID controller $358_1$ provides output it generates based on this input to a second PID controller $358_2$, which itself operates on third function block $354_3$.

A second AI process $356_2$ may also obtain, e.g., from a sensor, analog input that it may provide to second PID controller $358_2$. Like first PID controller $358_1$, second PID controller $358_2$ may output various data and/or perform various operations based on the inputs it receives from first and second AI processes $356_{1-2}$. The data output by second PID controller $358_2$ may include, for instance, data that controls process automation variables such as flow regulation, temperature, pressure, etc. In FIG. 3, second PID controller $358_2$ provides its output (e.g., a command) to a first analog output (AO) process $360_1$ that is part of fifth function block $354_5$. First AO process $360_1$ may, for instance, operate an actuator (e.g., 116) based on the data it received using analog output signal(s).

Second loop $352_2$ includes three function blocks $354_{6-8}$. Sixth function block $354_6$ includes a third AI process $356_3$ that may obtain input from, for instance, a sensor. Third AI process $356_3$ may provide this sensor data as output to a third PID controller $358_3$. Like other PID controllers, third PID controller $358_3$ may issue perform various operations and/or output various data based on the sensor data it receives from third AI process $356_3$. For example, third PID controller $358_3$ may output data to a second AO process $360_2$, which in turn may control an actuator or other component based on the data received from third PID controller $358_3$.

FIG. 4 schematically depicts an example of how the various components depicted in FIG. 3 can be distributively deployed among a plurality of execution engines $238_{1-3}$ executed by a plurality of process automation nodes, which in this example include three DCNs $310_{1-3}$ with three corresponding logics $312_{1-3}$. First, second, and fourth function blocks $354_1$, $354_2$, and $354_4$ of first loop $352_1$ have been assigned to a first execution engine $238_1$ that is executed by first DCN $310_1$, which itself includes a sensor 118 and a first FT component $314_1$. Sensor 118 may generate sensor data that is captured by first AI process $356_1$ and FT component $314_1$ may generate sensor data that is captured by second AI process $354_2$. Third function block $354_3$ has been assigned to a second execution engine $238_2$ that is executed by second DCN $310_2$, which itself does not include any input or output elements.

Fifth function block $354_5$, which includes first AO process $360_1$, has been assigned to a third execution engine $238_3$ executed by third DCN $310_3$, which itself includes both a second FT component $314_2$ and first and second actuators $316_{1-2}$. Eighth function block $354_8$, which includes second AO process $360_2$, has also been assigned to third DCN $310_3$. Thus, first AO process $360_1$ may control one of actuators $316_{1-2}$ and second AO process $360_2$ may control the other.

As part of function blocks $354_1$ and $354_2$, respectively, first AI process $356_1$ and first PID controller $358_1$ are assigned to the same DCN $310_1$. Accordingly, they are able to exchange data locally via busses and/or circuitry of first DCN $310_1$. By contrast, as part of fourth function block $354_4$, second AI process $356_2$ is assigned to one process automation node (first DCN $310_1$), but sends its output to a different process automation node to which second PID controller $358_2$ (and third function block $354_3$) is assigned, namely, second DCN $310_2$.

Accordingly, in order to distributively deploy FBAPs (e.g., first loop $352_1$ or second loop $352_2$) or portions thereof across different process automation nodes, in various implementations, communication modules also referred to herein as "publish" and "subscribe" components may be implemented to facilitate communication between these components, e.g., across computer network(s). For example, in order for second AI process $356_2$ to provide its output to second PID controller $358_2$, a publish ("PUB" in FIG. 3) component has been generated in association with fourth function block $354_4$ (e.g., as part of first execution engine $238_1$). Likewise, a subscribe ("SUB" in FIG. 3) component has been generated in association with third function block $354_3$ (e.g., as part of second execution engine $238_2$, depicted to the immediate left of second PID controller $358_2$) and has been subscribed to data published by the publish component of fourth function block $354_4$. Similar publish and subscribe components are depicted in FIG. 3 for the other FBAP components (e.g., function blocks) that have been distributed across different process automation nodes.

In some implementations, publish and subscribe components may be generated by execution engines 238 based on the function blocks assigned to them. Alternatively, publish and subscribe components may be pre-compiled and linked to inputs and/or outputs of function blocks, e.g., during deployment. A publish or subscribe component may take various forms, such as an additional function block (e.g., created specifically to enable communication between other function blocks), a standard interface provided by an execution engine 238 in compliance with, for instance, an open standard, a web application programming interface (API) that conforms to the representational state transfer (REST) architectural style, software network interfaces, remote procedure calls, ports, network sockets, etc.

Figure 5:
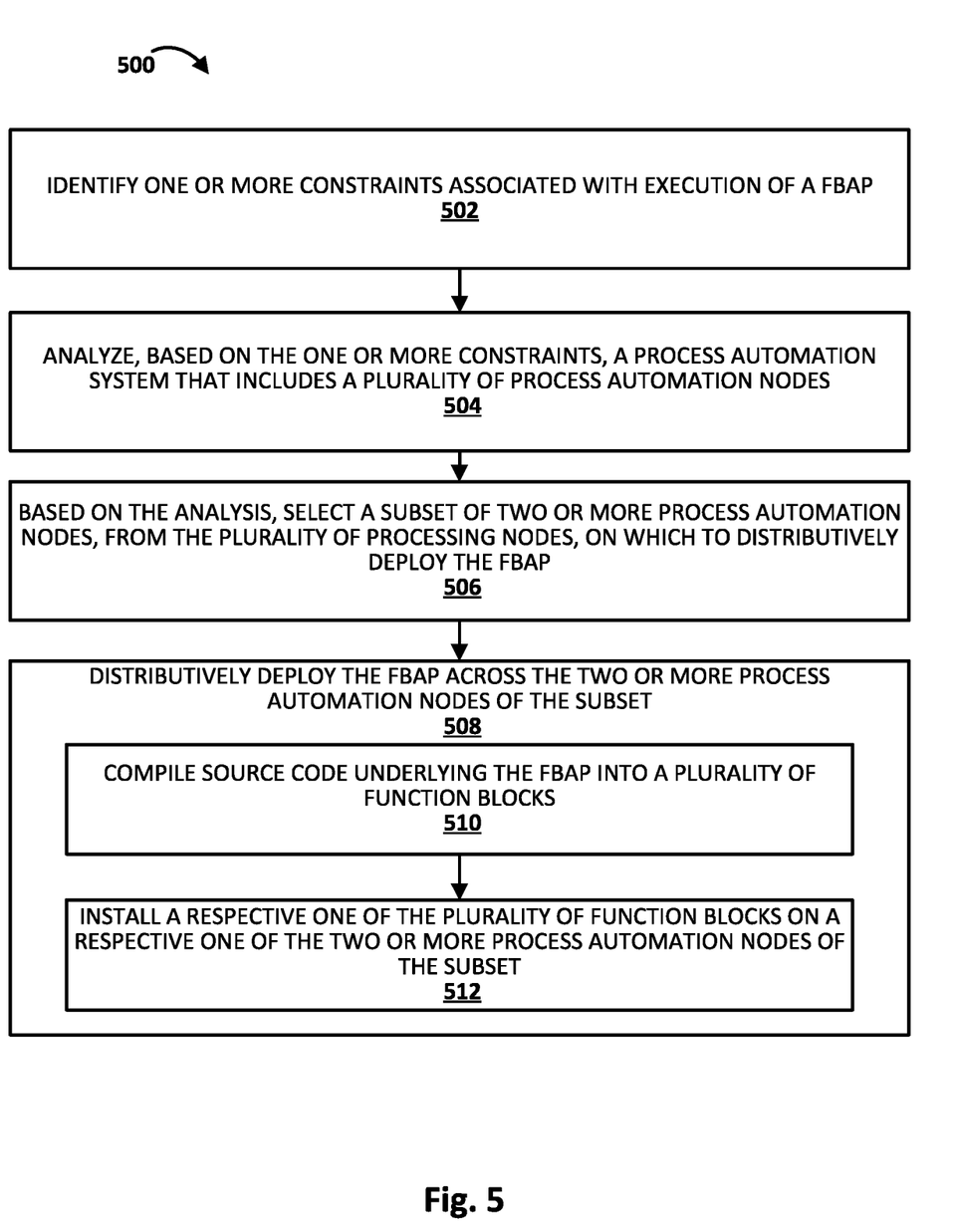
FIG. 5 illustrates an example method for performing selected aspects of the present disclosure.

FIG. 5 is a flowchart illustrating an example method 500 for practicing selected aspects of the present disclosure, in accordance with implementations disclosed herein. For convenience, the operations of the flow chart are described with reference to a system that performs the operations. This system may include various components of various computer systems, such as PDI 104 and/or matching engine 103, and/or other devices such as any of DCNs $110_{1-N}$. Moreover, while operations of method 500 are shown in a particular order, this is not meant to be limiting. One or more operations may be reordered, omitted or added.

At block 502, the system, e.g., by way of PDI 104 (if during intake) or matching engine 103 (if during distributive deployment), may identify one or more constraints associated with execution of a FBAP. Various examples of constraints have been described elsewhere herein, and include, for instance, location constraints, time limits, network constraints, computing resource constraints, and so forth. The FBAP as a whole (e.g., $352_1$ or $352_2$) may be subject to various constraints, and/or individual components of the FBAP, such as function blocks (e.g., $354_{1-5}$, $354_{6-8}$) may be subject to constraints. Constraints may be identified by PDI 104, for instance, by analyzing comments and/or code snippet(s) contained in source code file(s) underlying the FBAP, in documentation related to the FBAP, from manually-provided constraints (e.g., provided at IDE 222), from tags (e.g., 224) associated with FBAPs, and so forth. Constraints may be identified by matching engine 103, for instance, from data 232-235 stored in database 105.

At block 504, the system, e.g., by way of matching engine 103, may analyze, based on the one or more constraints, a process automation system (e.g., 108) that includes a plurality of process automation nodes (e.g., DCNs $110_{1-N}$, DCNs $310_{1-3}$) that in many cases provide a plurality of execution engines (e.g., $238_{1-Y}$ in FIG. 2, $238_{1-3}$ in FIG. 4). In particular, matching engine 103 may analyze data and/or features (e.g., processed by PDI 104) that are stored in database 105 and/or that are obtained in real time. These data and/or features may include, but are not limited to, computational resources and/or capabilities (e.g., 230), network topology (e.g., 228), location information (e.g., 226, can include, for instance, position coordinates, placement within a particular room or area, etc.), measured environmental factors such as temperature and/or humidity, and so forth.

In some implementations, FBAPs may be distributively deployed across a process automation system in stages. Earlier deployments may impact later deployments because, for instance, computational resources may become exhausted or strained as FBAPs are distributively deployed, and/or individual nodes and/or the environments in which they operate may undergo increased temperatures as the computational strain increases. Thus, in some implementations, the analysis of block 504 may include: identifying a first candidate process automation node of the plurality of process automation nodes that satisfies one or more of the constraints associated with execution of the FBAP, and evaluating actual or potential exhaustion of computing resources of the first candidate process automation node. This evaluation may include, for instance, monitoring memory and/or CPU usage of the first candidate process automation node and comparing that to constraint(s) associated with a FBAP currently under consideration. Based on the evaluating, if the first candidate process automation node is overtaxed or is likely to be overtaxed (and/or overheated), another process automation node having (i) sufficient computing resources and (ii) the closest spatial or network relationship to the first candidate process automation node may be selected instead.

Based on the analyzing of block 504, at block 506, the system, e.g., by way of matching engine 103, may select a subset of two or more process automation nodes (or more particularly, execution engines), from the plurality of processing nodes, on which to distributively deploy the FBAP. In various implementations, matching engine 103 may select process automation nodes that satisfy the FBAP constraints identified at block 502. For example, if a FBAP is required to execute a control loop within some time limit, then process automation nodes may be selected that will collectively be able to execute the control loop within that time limit. The nodes' ability to satisfy such a time constraint may be based on a variety of factors, such as execution engine capabilities (230), availability of computational resources in view of already-deployed FBAP components, spatial distances between the nodes (data may require more time to travel over greater distances), network hops between the nodes, availability or characteristics of out-of-band channels, smart junction boxes between the nodes (smart junction boxes may in some cases affect latency and/or bandwidth), and so forth.

In response to selecting the subset at block 506, at block 508, the system, e.g., by way of matching engine 103 and/or IDE 222, may distributively deploy the FBAP across the two or more process automation nodes of the subset. In some implementations, this distributive deployment may include, at block 510, compiling the source code underlying the FBAP into a plurality of builds, e.g., bytecode or binary function blocks. For example, function blocks assignments determined by matching engine 103 at block 506 may be conveyed as application data to components such as execution engines of 238 of the assigned process automation nodes 110. This application data may be provided to IDE 222, e.g., from the assigned process automation nodes. Based on this application data, IDE 222 may compile the FBAP and deploy the resulting builds to the assigned process automation nodes.

In some implementations, this distributive deployment may include, at block 512, installing a respective one of the plurality of function blocks on a respective one of the two or more process automation nodes of the subset. In some implementations, the function blocks may be compiled onboard the process automation node on which they are deployed. In other implementations, the function blocks may be compiled or otherwise generated remotely, into a binary executable, a bytecode file, an executable script, etc., and then pushed to the target process automation node.

Figure 6:
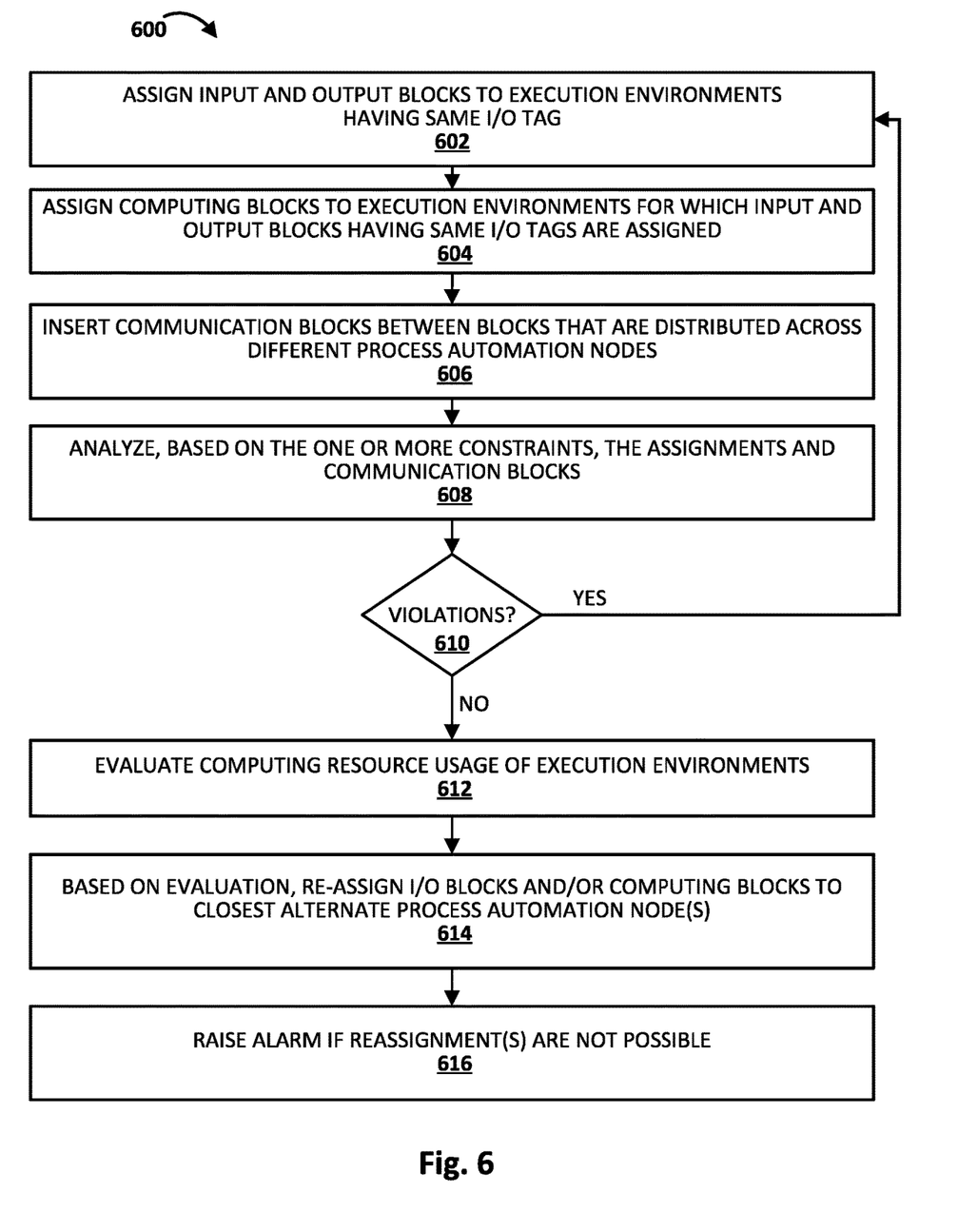
FIG. 6 illustrates an example method for performing selected aspects of the present disclosure.

FIG. 6 is a flowchart illustrating an example method 600 for practicing selected aspects of the present disclosure, in accordance with implementations disclosed herein. For convenience, the operations of the flow chart are described with reference to a system that performs the operations. This system may include various components of various computer systems, such as PDI 104 and/or matching engine 103, and/or other devices such as any of DCNs 110$_{1-N}$. Moreover, while operations of method 600 are shown in a particular order, this is not meant to be limiting. One or more operations may be reordered, omitted or added.

At block 602, the system, e.g., at the behest of a user operating IDE 222 or automatically, may assign input and/or output blocks (e.g., AI 356 and/or AO 360) to execution environments (e.g., 238) having matching I/O tags. At block 604, the system, e.g., at the behest of a user operating IDE 222 or automatically, may assign computing blocks (e.g., PID 358) to execution environments (e.g., 238) for which input and output blocks (e.g., 356, 360) having the same I/O tags were assigned in block 602.

At block 606, the system may insert communication blocks (e.g., PUB and SUB blocks in FIG. 4) between the I/O and/or computing blocks that were distributed across different physical process automation nodes as a result of the assignments of blocks 602-604. An example of this was illustrated in FIG. 4.

At block 608, the system may analyze, based on one or more FBAP constraints (e.g., identified at block 502 of method 500), the assignments of blocks 602-604 to determine, at block 610, whether any of those constraints were violated. If the answer at block 610 is yes, in some implementations, method 600 may proceed back to block 502 and/or block 504. However, if the answer at block 610 is no, then method 600 may proceed to block 612.

At block 612, the system, e.g., by way of matching engine 103, may evaluate computing resource usage (e.g., memory, processor cycles, etc.) of the execution environments to which the various blocks were assigned, as described previously. Based on the evaluation of block 612, at block 614, the system may reassign I/O and/or computing blocks to execution environments of the closest alternate process automation nodes. At block 616, the system may raise an alarm or warning for the user (e.g., operating IDE 222) if any of the reassignments of block 614 are not possible, e.g., because they would violate the FBAP constraints described previously.

Figure 7:
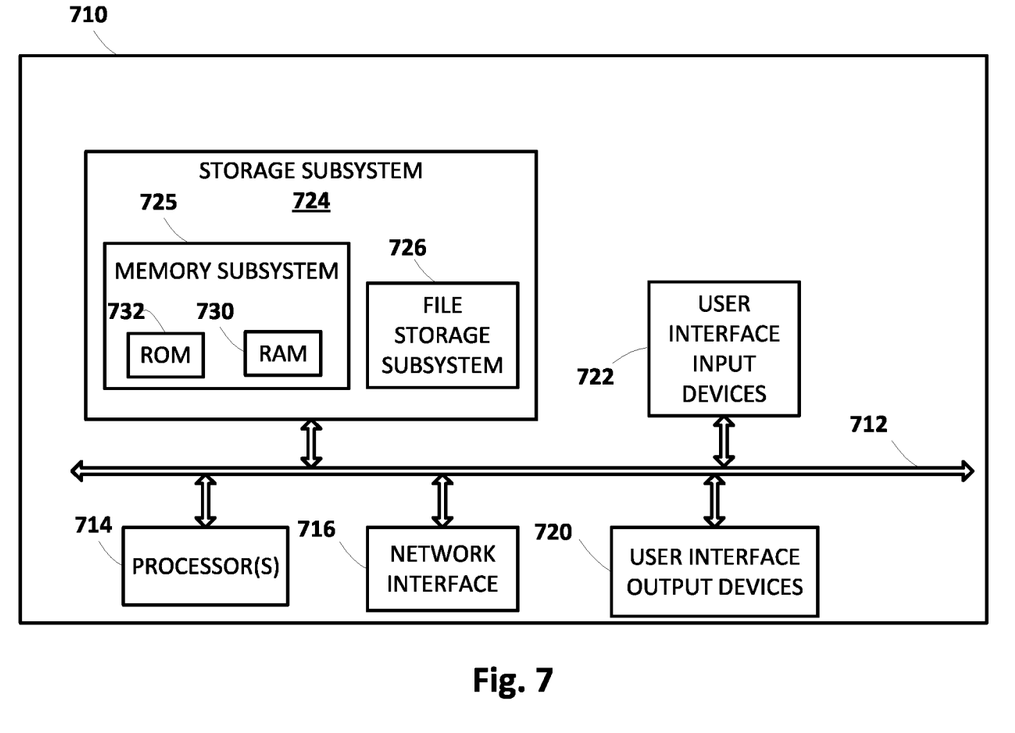
FIG. 7 schematically illustrates an example computer architecture on which selected aspects of the present disclosure may be implemented.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to networks (physical and/or virtual) and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 5 and 6, as well as to implement various components depicted in FIGS. 1-4.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

identifying, from a plurality of communication protocols, one or more communication protocols used between two or more process automation nodes that are selected to carry out a process automation software application;

using one or more of the identified communication protocols, selecting a maximum physical distance permitted between the two or more process automation nodes, wherein the maximum physical distance is greater when the two or more process automation nodes are connected using a first communication protocol of the plurality of communication protocols than when the two or more process automation nodes are connected using a second communication protocol of the plurality of communication protocols;

analyzing, based on the maximum physical distance, a process automation system that includes a plurality of process automation nodes;

based on the analyzing, selecting a subset of two or more process automation nodes, from the plurality of process automation nodes, on which to distributively deploy the process automation software application; and in response to selecting the subset:

distributively deploying the process automation software application across the two or more process automation nodes of the subset.

2. The method of claim 1, further comprising assembling the process automation software application into a plurality of function blocks, wherein the distributively deploying includes installing a respective one of the plurality of function blocks on an execution engine of a respective one of the two or more process automation nodes of the subset.

3. The method of claim 2, wherein the assembling includes generating one or more communication modules for each of the plurality of respective function blocks, the one or more communication modules facilitating publishing or subscribing of data between the plurality of function blocks.

4. The method of claim 1, wherein one or more constraints associated with execution of the process automation software application include a limit on a number of process automation nodes on which the process automation software application can be distributively deployed.

5. The method of claim 4, wherein the limit on the number of process automation nodes is determined based upon available computing resources of the plurality of process automation nodes.

6. A method implemented using one or more processors, comprising:

identifying one or more constraints associated with execution of a process automation software application, wherein one of the constraints includes a maximum physical distance between two or more process automation nodes that are selected to carry out the process automation software application, and wherein the maximum physical distance is determined based on a communication protocol used between process automation nodes that carry out the process automation software application;

analyzing, based on the one or more constraints, a process automation system that includes a plurality of process automation nodes;

based on the analyzing, selecting a subset of two or more process automation nodes, from the plurality of process automation nodes, on which to distributivily deploy the process automation software application; and in response to selecting the subset:

distributivily deploying the process automation software application across the two or more process automation nodes of the subset;

wherein the one or more constraints associated with execution of the process automation software application include a time limit for execution of a control loop that includes or is implemented by the process automation software application.

7. The method of claim 1, wherein the one or more constraints associated with execution of the process automation software application further include one or more location constraints.

8. The method of claim 7, wherein one or more of the location constraints are imposed between two or more function blocks of the process automation software application.

9. The method of claim 1, wherein another process automation node comprises a sensor that generates sensor data that is processed by the process automation software application.

10. A method implemented using one or more processors, comprising:
identifying, from a plurality of communication protocols, one or more communication protocols used between two or more process automation nodes that are selected to carry out the process automation software application;
using one or more of the identified communication protocols, selecting a maximum number of network hops permitted between the two or more process automation nodes, wherein the maximum number of network hops is greater when the two or more process automation nodes are connected using a first communication protocol of the plurality of communication protocols than when the two or more process automation nodes are connected using a second communication protocol of the plurality of communication protocols;
analyzing, based on the maximum network hops, a process automation system that includes a plurality of process automation nodes;
based on the analyzing, selecting a subset of two or more process automation nodes, from the plurality of process automation nodes, on which to distributively deploy the process automation software application; and
in response to selecting the subset:
distributively deploying the process automation software application across the two or more process automation nodes of the subset.

11. A method implemented using one or more processors, comprising:
identifying a plurality of function blocks that cooperate to implement a control loop within a process automation system, as well as one or more constraints of the control loop, wherein one of the constraints of the control loop includes a maximum number of network hops between a distributed control node (DCN) selected to host one or more of the function blocks and a sensor that generates sensor data that is processed by one or more of the function blocks;
analyzing a plurality of candidate DCNs of the process automation system to identify a subset of two or more DCNs, from the plurality of candidate DCNs, that collectively satisfy the one or more constraints of the control loop; and
distributively deploying the plurality of function blocks across execution engines provided by the two or more DCNs of the subset.

12. A method implemented using one or more processors, comprising:
identifying one or more constraints associated with execution of a process automation software application wherein one of the constraints include a maximum number of smart junction boxes between two or more process automation nodes selected to carry out the process automation software application;
analyzing, based on the one or more constraints, a process automation system that includes a plurality of process automation nodes;
based on the analyzing, selecting a subset of two or more process automation nodes, from the plurality of process automation nodes, on which to distributively deploy the process automation software application; and
in response to selecting the subset:
distributively deploying the process automation software application across the two or more process automation nodes of the subset.

13. The method of claim 1, wherein the analyzing includes: identifying a first candidate process automation node of the plurality of process automation nodes that satisfies one or more of the constraints associated with execution of the process automation software application; evaluating actual or potential exhaustion of computing resources of the first candidate process automation node; based on the evaluating, selecting, as at least one of the subset of two or more process automation nodes, another process automation node having the closest spatial or network relationship to the first candidate process automation node.

14. A method implemented using one or more processors, comprising:
identifying one or more constraints associated with execution of a process automation software application, wherein one of the constraints includes a maximum physical distance between two or more process automation nodes that are selected carry out the process automation software application, and wherein the maximum physical distance is determined based on a communication protocol used between process automation nodes that carry out the process automation software application;
analyzing, based on the one or more constraints, a process automation system that includes a plurality of process automation nodes;
based on the analyzing, selecting a subset of two or more process automation nodes, from the plurality of process automation nodes, on which to distributively deploy the process automation software application; and
in response to selecting the subset:
distributively deploying the process automation software application across the two or more process automation nodes of the subset;
wherein the process automation software application comprises a first process automation software application of a plurality of process automation software applications to be deployed among the plurality of process automation nodes, and the method further comprises:
ranking the plurality of process automation software applications based on respective priorities of the plurality of process automation software applications; and
selecting, for each of the plurality of process automation software applications in an order determined based on the ranking, a respective subset of the plurality of process automation nodes on which to distributively deploy the process automation software application.

15. The method of claim 14, further comprising instructions to:
assemble the process automation software application into a plurality of function blocks, wherein the distributive deployment includes installation of a respective one of the plurality of function blocks on an execution engine of a respective one of the two or more process automation nodes of the subset; and
generate one or more communication modules for each of the plurality of respective function blocks, the one or more communication modules facilitating publishing or subscribing of data between the plurality of function blocks.

16. A system comprising one or more processors and memory storing instructions that, in response to execution of the instructions by the one or more processors, cause the one or more processors to:
identify a plurality of function blocks that cooperate to implement a control loop within a process automation system, as well as one or more constraints of the control loop, wherein one of the constraints of the control loop includes a maximum number of network hops between a distributed control node (DCN) selected to host one or more of the function blocks and a sensor that generates sensor data that is processed by one or more of the function blocks;
analyze a plurality of candidate DCNs of the process automation system to identify a subset of two or more DCNs, from the plurality of candidate DCNs, that collectively satisfy the one or more constraints of the control loop; and
distributively deploy the plurality of function blocks across execution engines provided by the two or more DCNs of the subset.

* * * * *